United States Patent [19]

Finnegan

[11] Patent Number: 4,735,867

[45] Date of Patent: Apr. 5, 1988

[54] CORROSION RESISTANT ALUMINUM CORE ALLOY

[75] Inventor: Walter D. Finnegan, Walnut Creek, Calif.

[73] Assignee: Kaiser Aluminum & Chemical Corporation, Oakland, Calif.

[21] Appl. No.: 805,533

[22] Filed: Dec. 6, 1985

[51] Int. Cl.$^4$ .................................... B32B 15/01
[52] U.S. Cl. .......................... 428/654; 148/11.5 A; 148/11.5 Q; 148/437; 148/440; 420/543; 420/552
[58] Field of Search .................. 420/543; 148/11.5 A, 148/11.5 Q, 437–440; 428/654

[56] References Cited

U.S. PATENT DOCUMENTS

| | | | |
|---|---|---|---|
| 4,093,474 | 6/1978 | Sperry et al. | 148/11.5 A |
| 4,284,437 | 8/1981 | Baba et al. | 148/11.5 A |

FOREIGN PATENT DOCUMENTS

| | | | |
|---|---|---|---|
| 113856 | 9/1980 | Japan | 428/654 |
| 200745 | 11/1984 | Japan | 148/11.5 A |

*Primary Examiner*—L. Dewayne Rutledge
*Assistant Examiner*—Robert L. McDowell
*Attorney, Agent, or Firm*—Andrew E. Barlay

[57] ABSTRACT

A novel aluminum alloy contains vanadium as an alloying element, at a concentration ranging from about 0.02% to about 0.4% by weight. The vanadium imparts corrosion resistance to the alloy, particularly when the alloy is used as a core alloy in a vacuum brazing sheet. A further improvement in corrosion resistance is achieved by processing the alloy or brazing sheet in such a manner that the final processing step is a cold work to a reduction of about 10% to about 20%.

20 Claims, No Drawings

CORROSION RESISTANT ALUMINUM CORE ALLOY

BACKGROUND OF THE INVENTION

1. Field of the Invention

This invention relates to aluminum alloys, and particularly to aluminum alloys used in corrosive environments.

2. Description of the Relevant Art

Aluminum has long been known for its resistance to corrosion, a property which renders it a favorable material of construction for a wide variety of purposes. In particular, it has gained wide acceptance in the manufacture of heat exchangers such as, for example, automotive radiators and evaporators for air conditioning units. Depending on the type of exchanger, the parts may be joined together by welding or brazing.

Despite aluminum's inherent corrosion resistance, corrosion still occurs. This is particularly true in materials joined by brazing, since the brazing operation causes intergranular penetration of the core material by certain species in the brazing alloy, notably silicon. When the brazed product is subjected to a corrosive environment, the intergranular regions in the core, where silicon is present in high concentrations, are particularly susceptible to corrosion. In automotive radiators, for example, where the brazing alloy is present only on the exterior surface of the tubes, the salts and moisture from the road are sufficiently corrosive to cause attack from the outside, resulting ultimately in pinhole formation.

This problem has been addressed in the literature in a variety of ways. An early example is Miller, U.S. Pat. No. 2,821,014 (Jan. 28, 1958), where it is disclosed that intergranular corrosion problems in flux and dip brazing are alleviated by adding an interlayer between the structural member portion and the brazing layer. The interlayer is aluminum or an aluminum-base alloy, particularly certain magnesium-containing alloys, having a melting point greater than that of the structural alloy. The solution offered by Singleton et al., U.S. Pat. No. 3,788,824 (Jan. 29, 1974) and its divisional, U.S. Pat. No. 3,881,879 (May 6, 1975), is directed to vacuum brazing, and involves the addition of iron to either the core alloy or the cladding alloy as an alloying element, resulting in improvements in both corrosion resistance and sag resistance.

Anthony et al., U.S. Pat. No. 4,039,298 (Aug. 2, 1977) address both flux and vacuum brazing, and disclose a composite of complex and highly specified composition as being particularly beneficial in terms of corrosion properties. The disclosed core alloy contains specified amounts of manganese, copper, chromium, silicon and iron as alloying elements with both a solid solution and an alpha-phase, whereas the alloying elements in the cladding are bismuth and silicon. An additional disclosure by the same patentees appears in U.S. Pat. No. 4,093,782 (June 6, 1978) and its continuation-in-part, U.S. Pat. No. 4,167,410 (Sept. 11, 1979), in which the core alloy contains a specified combination of chromium and manganese, with resultant improvements in both corrosion resistance and sag resistance.

A still further disclosure by the same patentees appears in U.S. Pat. No. 4,209,059 (June 24, 1980), where a conventional core alloy is clad with a brazing alloy on one side and a "sacrifical cladding layer" on the other, the result being a lessening of crevice corrosion between the aluminum header plate and the plastic tank in an automobile radiator. A "sacrificial anode" effect is disclosed in Tanabe et al., U.S. Pat. No. 4,317,484(March 2, 1982), and Terai et al., U.S. Pat. No. 4,203,490 (May 20, 1980), for tube-and-fin heat exchangers by incorporating tin and zinc into the fin core material and manganese into the tube material. A similar differentiation between fins and tubes is disclosed in Kanada et al., U.S. Pat. No. 4,410,036 (Oct. 18, 1983), whereby the fins are provided with a lower electrochemical potential.

Setzer et al., U.S. Pat. No. 4,399,695 (Nov. 30, 1976), disclose a core alloy which contains a chromium-manganese-zirconium combination, the sole claimed benefit however being an improvement in sag resistance. Sag resistance is also addressed by Toma et al. in U.S. Pat. No. 4,511,632 (Apr. 16, 1985), where manganese, silicon and zinc are included in the cladding layer. A combination of copper and titanium as primary alloying elements in the core alloy is disclosed in Kaifu et al., U.S. Pat. No. 4,339,510 (July 13, 1982), as providing a benefit in intergranular corrosion resistance.

A different approach is disclosed by Nakamura, U.S. Pat. No. 4,172,548 (Oct. 30, 1979), in which corrosion following fluxless brazing processes in general (including both vacuum brazing and brazing in an inert atmosphere) is controlled by controlling the grain size of the brazing sheet to at least 60 microns in diameter, achieved by a controlled cold work followed by a full anneal.

Thus, with the exception of Nakamura, existing solutions generally involve the introduction of specific elements in the alloy compositions. Processing modifications have also been used to similar effect, notably that disclosed in copending, commonly owned application Ser. No. 634,529, filed July 26, 1984, now U.S. Pat. No. 4,586,964. In general, however, such features as specific combinations, degrees and sequences of strain hardening and annealing are generally used for controlling the ductility and tensile properties of the final product. Setzer et al., referenced above, demonstrates several of these combinations, ranging from those ending with a fully hardened product (maximum cold work) to those ending with a fully strainfree (annealed) product. The use of a partial anneal as the final step to leave the desired amount of cold work remaining in the product is disclosed by Singleton, U.S. Pat. No. 3,963,454 (June 15, 1976) at column 4, lines 34–58.

SUMMARY OF THE INVENTION

It has now been discovered that the introduction of vanadium as an alloying element enhances the corrosion resistance of aluminium and aluminum alloys. In particular, brazing sheets containing such alloys as core alloys are unusually resistant to corrosion even after vacuum brazing. It has further been discovered that corrosion resistance is improved even more by the inclusion of a final cold work step to a reduction ranging from about 10% to about 20%.

DESCRIPTION OF THE PREFERRED EMBODIMENTS

The amount of vanadium in the alloy is not critical to the invention and may vary considerably. In most applications, however, amounts ranging from about 0.02% to about 0.4% by weight, preferably from about 0.05% to about 0.3%, will provide the best results.

The remainder of the alloy may vary widely in composition, although those alloys containing silicon, manganese, magnesium or combinations of these as the primary alloying elements, i.e., the components present in the highest concentrations other than the aluminum itself, are preferred. The concentrations of these elements may vary widely but typically range from about 0.2% to about 2.0% by weight. In preferred embodiments, the core alloy is a non-heat-treatable alloy, most preferably of the 1XXX, 3XXX or 5XXX series of Aluminum Association designated alloys. Examples are the 1100, 3003, 3005, 3105, and 5005 alloys.

In embodiments where the alloy is clad for brazing, the cladding alloy (also referred to herein as a "brazing alloy") may be any aluminum alloy capable of flow under brazing conditions to form fillets at the contact points sufficient to produce a sturdy bond. Such alloys will generally contain silicon as the primary alloying element, preferably at a concentration ranging from about 5% to about 15% by weight. Examples of such alloys are those of the 4XXX series, e.g., 4004, 4043, 4045, 4047, 4104 and 4343.

Brazing sheets of particular interest are those having a hardness ranging from fully annealed to about three-quarters hard. For example, air-conditioning evaporators require fully annealed metal, whereas for radiators one-quarter to three-quarters hard is preferred. As known to those skilled in the art, full hard is recognized in the industry as being equivalent to the hardness of a product which has been cold worked to a 75% reduction. In most preferred embodiments of the invention, the final brazing sheet is approximately one-half hard, i.e., ASTM temper designation H14.

As mentioned above, preferred embodiments within the scope of the invention are those where the processing includes rolling the alloy or composite to form a sheet product, annealing the sheet product to a strain-free state, and finally cold working the annealed product to a reduction of about 10% to about 20%. The rolling step may include a number of substeps, including a hot working to bond the cladding to the core, a scalping or etching to remove the oxide formed on the surface during the hot working, and a cold working to bring the gauge down to a value somewhat higher than the desired ultimate value, so that the full anneal and final cold working will produce both the hardness and gauge sought.

The cold working and annealing steps may be done according to conventional techniques well known to those skilled in the art. The annealing is generally done at a temperature of from about 500° F. to about 850° F. (260° C. to 427° C.), for a period of time ranging from about 0.5 hour to about 5 hours, preferably from about 600° F. to about 700° F./ (316° C. to 371° C.) for about 1 to 3 hours.

For embodiments involving composite sheets, the cladding layer generally forms from about 0.1 percent to about 20 percent, preferably from about 1.0 percent to about 15 percent, of the thickness of the entire composite, and is present on one or both sides of the core, depending on the intended use of the brazing sheet. The bonding of the cladding to the core is typically achieved by conventional hot rolling techniques at temperatures ranging from about 450° F. to about 1,000° F. (230° C. to 540° C.). The cladding may be preceded by homogenization of the core typically at a temperature within the approximate range of from 800° F. to 1150° F. (427° C. to 621° C.), although in some alloys and procedures corrosion resistance will be improved by omitting the homogenization step.

Cold working is generally done by rolling, stretching or forming at ambient temperature. In general, the initial cold work step (prior to the full anneal) is done to a reduction of at least about 50%, preferably at least about 80%.

Products prepared by the process of the present invention may be vacuum brazed according to conventional techniques. These usually involve a pressure of $10^{-2}$ torr or less, preferably between about $10^{-4}$ and about $10^{-6}$ torr, and a temperature ranging from about 1,000° F. to about 1,200° F. (540°-650° C.), preferably from about 1060° F. to about 1125° F. (571° C. to 607° C.).

The following examples are offered for purposes of illustration only, and are intended neither to define nor limit the invention in any manner.

EXAMPLE 1

BASELINE TESTS

This example sets forth standards against which the product and process of the present invention may be compared. A variety of alloys, clad and unclad and of various tempers, none of which contained vanadium, were subjected to a standard corrosion test. The same test is used in the remaining examples in this specification.

For the baseline test, pieces of sheet product ranging in thickness from 0.013 inch (0.03 cm) to 0.038 inch (0.10 cm) were cut into coupons measuring 2×3 inches (5.1×7.6 cm). Each coupon was masked on one side with electroplater's tape. The other side was intermittently exposed to an atomized corrosion solution (42 g/liter synthetic sea salt, 10 ml/liter acetic acid, balance water) in a 98% humid atmosphere for variable periods of time at a temperature of 120° F. (49° C.) according to ASTM Procedure No. G43. The coupons were then rinsed in cold water and cleaned in a solution of chromic and phosphoric acids (ASTM Solution No. G1) at 180° F. (82° C.), and baked for at least thirty minutes at 250° F. (121° C.) to remove retained water. Each coupon was then pressurized with air at 20 psig (13.8 newtons/cm$^2$) under water and the number of perforations which resulted was determined by counting the streams of bubbles. The number of perforations per piece was recorded as a function of the number of hours in the corrosion solution.

The results are shown in Table 1.1 where each entry represents a single coupon. In some cases two coupons were tested under identical conditions and the results for each are shown separated by a comma. The plus sign indicates that the actual number was above the number shown.

TABLE 1.1

BASELINE TEST RESULTS WITHOUT BRAZING: PERFORATIONS PER SAMPLE

| Composite | | | Thickness | No. of Perforations Hours: | | | | | | |
|---|---|---|---|---|---|---|---|---|---|---|
| Core | Cladding | Temper | (in.) | 48 | 72 | 96 | 120 | 144 | 168 | 192 |
| 3003 | — | 0 | 0.026 | | 0 | 8 | 12 | 16+ | | |
| 3003 | — | H16 | 0.038 | | | | 0 | | 2,6 | 2 |
| 3004 | — | H15 | 0.023 | | 0 | 0 | 6 | 2 | | |
| 3004 | — | H19 | 0.018 | | 0 | 4 | 7 | 16 | | |
| 3004 | — | H22 | 0.013 | 0 | 4,0 | | 15+ | | | |
| 3004 | — | H22 | 0.013 | 9 | 11 | 16+ | | | | |
| 3005 | — | H25 | 0.018 | | 3 | 6 | 10+ | 12+ | | |
| 3005 | — | H25 | 0.018 | 1 | 10 | 12 | 15+ | | | |
| 3105 | — | 0 | 0.017 | | 0 | 4 | 20+ | | | |
| 3105 | — | H15 | 0.017 | 0 | 0 | 12 | | | | |
| 3105 | — | H18 | 0.0 | | | 0 | | | 6,8 | |
| 3005 | 4045 | H24 | 0.013 | | | | | | | |
| (clad side exposed) | | | | | 0,1 | 0,0 | 4 | 2 | 2 | |
| 3003 | 4104 | H14 | 0.015 | | | | | | | |
| (clad side exposed) | | | | | | 6 | 11 | 13 | 16+ | |
| (core side exposed) | | | | | | 20+ | 20+ | 20+ | 20+ | |

The alloys used in the tests shown in Table 1 had the compositions shown in Table 1.2.

TABLE 1.2

TEST ALLOYS
Weight Percents (Balance Al)

| Element | 3003 | 3004 | 3005 | 3105 | 4045 | 4104 |
|---|---|---|---|---|---|---|
| Si | 0.21 | 0.17 | 0.13 | 0.27 | 9.5 | 10.15 |
| Fe | 0.60 | 0.42 | 0.50 | 0.47 | 0.18 | 0.19 |
| Cu | 0.14 | 0.12 | 0.11 | 0.13 | 0.06 | 0.033 |
| Mn | 1.00 | 1.08 | 1.28 | 0.48 | 0.02 | 0.023 |
| Mg | 0.007 | 1.01 | 0.52 | 0.60 | 0.09 | 1.43 |
| Cr | 0.002 | 0.01 | 0.01 | 0.02 | — | 0.003 |
| Zn | 0.027 | 0.03 | 0.03 | 0.04 | 0.03 | 0.028 |
| Ti | 0.009 | 0.03 | 0.02 | — | — | 0.009 |
| Bi | — | — | — | — | — | 0.096 |

A second group of coupons, clad on one side, total thickness 0.015 in (0.038 cm) and measuring 23/16×4¾ inches (5.6×12.1 cm) was brazed while suspended vertically in a three-chamber vacuum brazing furnace at a pressure of $1 \times 10^{-5}$ torr and a temperature gradually increasing to 1100° F. ±5 (593° C.) in twelve minutes and held at that level for two minutes. The coupons were then further cut into 2-inch (5.1-cm) squares and the nonclad side masked. The corrosion test produced the results shown in Table 1.3.

TABLE 1.3

BASELINE TEST RESULTS WITH BRAZING: PERFORATIONS PER SAMPLE

| Composite | | | No. of Perforations Hours: | | | | |
|---|---|---|---|---|---|---|---|
| Core | Cladding | Temper | 24 | 48 | 72 | 96 | 120 |
| 3003 | 4104 | H24 | 12 | 25+ | 25+ | 25+ | |
| 3003 | 4104 | H24 | 0 | 1 | 13 | 17 | 25+ |
| (+0.15% Cr) | | | | | | | |
| 3003 | 4104 | H14 | 0 | 0 | 0 | 1 | 9 |
| (+0.15% Cr) | | | | | | | |

EXAMPLE 2

Aluminum-Vanadium Alloy Tests

A composite (brazing sheet) was formed from the following materials:

TABLE 2.1

TEST COMPOSITE
Weight Percents (Balance Al)

| Element | Core | Cladding |
|---|---|---|
| Si | 0.50 | 12.0 |
| Fe | 0.59 | 0.2 |
| Cu | 0.28 | 0.08 |
| Mn | 1.19 | 0.03 |
| Mg | 0.56 | 0.15 |
| Cr | 0.004 | — |
| Zn | 0.026 | 0.02 |
| Ti | 0.002 | — |
| V | 0.26 | — |

The composite was hot rolled to 0.0206 inch (0.052 cm), annealed at 650° F. (360° C.) for 25 minutes, then cold worked to 0.0187 inch (0.047 cm, a 9.2% reduction). Pieces of the sheet were subjected to a vacuum brazing cycle as in Example 1, cut to coupons 2.5 inches (6.4 cm) square, cooled to room temperature, masked on the unclad side, and corrosion tested as in Example 1.

No leaks were detected on coupons exposed for 96 and 120 hours. Facial blisters occurred on coupons exposed for 240 hours, still without leaks.

EXAMPLE 3

Aluminum-Vanadium Alloy Tests

This example demonstrates the effects of final cold working on corrosion susceptibility. Two composites were prepared as follows:

TABLE 3.1

TEST COMPOSITES
Weight Percents (Balance Al)

| Element | Core A | Core B | Cladding for both |
|---|---|---|---|
| Si | 0.21 | 0.007 | 12.0 |
| Fe | 0.41 | 0.01 | 0.2 |
| Cu | 0.09 | 0.003 | 0.08 |
| Mn | 1.13 | 0.003 | 0.03 |
| Mg | 0.32 | 0.002 | 0.15 |
| Cr | 0.4 | — | — |
| Zn | 0.18 | — | 0.02 |
| Ti | 0.08 | 0.01 | — |
| V | 0.247 | 0.247 | — |

For each core, both a homogenized and an ascast ingot were prepared. All were then scalped and clad 10% on one side to form the composites.

The composites were hot rolled to 0.140 inch (0.36 cm) thickness, then cold rolled to 0.018 inch (0.046 cm). Each sheet was then cut into several portions. One portion was annealed by heating to 680° F. (360° C.) for two hours, then cold rolled to 0.0125 inch (0.032 cm) thickness (30% reduction). Other portions were cold rolled to an intermediate thickness, annealed at 680° F. for two hours, then cold rolled to 0.0125 inch such that the cold reductions after annealing approximated 20%, 15%, 10% and 5% among the various portions.

The samples were subjected to a vacuum brazing cycle as in Example 1 (the temperature this time gradually rising to 1115° F. (602° C.) over 33 minutes), cut into coupons 2 inches (5.1 cm) square, and cooled to room temperature. Two pieces of the 5% cold reduced portions were left unbrazed.

For the corrosion test, electroplater's tape was applied to the backside of each coupon, leaving the clad side exposed. Of the unbrazed coupons, one out of each pair was taped on the core side, and the other on the clad side. The corrosion test described in Example 1 was then run. The results are listed in Tables 3.2 and 3.3, which include observations relating to both surface blisters and leaks.

TABLE 3.2

TEST RESULTS - COMPOSITE A

| Final Cold Reduction (%) | As Cast | | | Homogenized | | |
|---|---|---|---|---|---|---|
| | First Blister (hours) | Test Term (hours) | Blisters/ Leaks | First Blister (hours) | Test Term (hours) | Blisters/ Leaks |
| Brazed: | | | | | | |
| 20 | 120 | 192 | >10/2 | | | |
| 15 | 144 | 192 | >10/2 | | | |
| 10 | 144 | 196 | 1/0 | | | |
| 5 | 24 | 120 | >10/2 | | | |
| Brazed: | | | | | | |
| 30 | 72 | 384 | 6/3 | 144 | 168 | 6/6 |
| 20 | 240 | 312 | >10/2 | 216 | 288 | 5/10 |
| 15 | 240 | 312 | >10/2 | 144 | 216 | 2/3 |
| 10 | 264 | 504 | 6/5 | 192 | 216 | 1/3 |
| 5 | 48 | 192 | >10/3 | 48 | 48 | 20/3 |
| Unbrazed: | | | | | | |
| Clad side exposed: | | | | | | |
| 5 | 120 | 168 | >10/0 | | | |
| Core side exposed: | | | | | | |
| 5 | 120 | 144 | 5/* | | | |

*Could not be pressure tested due to roughness of surface.

TABLE 3.3

TEST RESULTS - COMPOSITE B

| Final Cold Reduction (%) | As Cast | | | Homogenized | | |
|---|---|---|---|---|---|---|
| | First Blister (hours) | Test Term (hours) | Blisters/ Leaks | First Blister (hours) | Test Term (hours) | Blisters/ Leaks |
| Brazed: | | | | | | |
| 20 | 144 | 196 | 3/5 | 168 | 196 | 2/0 |
| 15 | 168 | 196 | 1/7 | 144 | 196 | 7/10 |
| 10 | 144 | 196 | 2/4 | 168 | 196 | 1/0 |
| 5 | 144 | 196 | 1/1 | 168 | 196 | 6/2 |
| Brazed: | | | | | | |
| 30 | 216 | 384 | 6/13 | 144 | 216 | 4/7 |
| 20 | 288 | 312 | 3/5 | 264 | 504 | 2/11 |
| 15 | 312 | 312 | 1/7 | 240 | 312 | 7/10 |
| 10 | 240 | 312 | 1/4 | 336 | 504 | 1/10 |
| 5 | 96 | 312 | 1/1 | 192 | 312 | 6/2 |
| Unbrazed: | | | | | | |
| Clad side exposed: | | | | | | |
| 5 | | 504 | 0/3 | | 504 | 0/0 |
| Core side exposed: | | | | | | |
| 5 | | 504 | 0/0 | | 504 | 0/0 |

Comparing the figures in these tables with those in Tables 1.1 and 1.3, one notices a shaarp reduction in the number of leaks (perforations) despite an increase in the amount of time in the corrosion test, all due to the presence of vanadium in the core alloy. (The "Blisters/-Leaks" figures represent observations taken at te end of the test term.) One also notices an increase in the number of hours before the first blister appears for samples which were given a final cold reduction with the range of approximately 10% to 20%. Two unexpected improvements have thus been demonstrated.

The foregoing description is offered primarily for illustrative purposes. It will be readily apparent to those skilled in the art that the particular materials and procedures described herein may be further varied or modified in numerous ways without departing from the spirit and scope of the invention as set forth in the following claims.

What is claimed is:

1. A brazing material comprising (a) an aluminum-base core alloy of the Aluminum Association 1XXX series containing vanadium as an alloying element and (b) a cladding comprising an aluminum-base brazing alloy.

2. A brazing material comprising (a) an aluminum-base core alloy selected from the group consisting of alloys of the Aluminum Association 3XXX and 5XXX series containing vanadium as an alloying element, and (b) a cladding comprising an aluminum-base brazing alloy.

3. A brazing material comprising (a) an aluminum-base core alloy of the Aluminum Association 3XXX series containing vandium as an alloying element, and (b) a cladding comprising an aluminum-base brazing alloy.

4. A brazing material comprising (a) an aluminum-base core alloy containing vanadium as an alloying element, and (b) a cladding comprising an aluminum-base brazing alloy of the Aluminum Association 4XXX series.

5. A brazing material in accordance with claim 1, 2, 3 or 4 in which said vanadium constitutes from about 0.02% to about 0.48% by weight of said aluminum-base core alloy.

6. A brazing material in accordance with claim 1, 2, 3 or 4 in which said vanadium constitutes from about 0.05% to about 0.3% by weight of said aluminum-base core alloy.

7. A brazing material in accordance with claim 1, 2, 3 or 4 in which said aluminum-base core alloy further comprises at least one member of the group consisting of silicon, magnesium and manganese.

8. A brazing material in accordance with claim 1, 2, 3 or 4 in which said aluminum-base core alloy further comprises magnesium, manganese or both, as primary alloying elements.

9. A brazing material in accordance with claim 1, 2, 3 or 4 in which said aluminum-base brazing alloy contains silicon as an alloying element.

10. A brazing material comprising (a) an aluminum-base core alloy of the Aluminum Association 3XXX series further containing from about 0.02% to about 0.4% by weight vanadium, and (b) a cladding comprising an aluminum-base brazing alloy containing from about 5% to about 15% silicon by weight.

11. A brazing material formed by:
 (a) cladding an aluminum-base core alloy containing vanadium as an alloying element with an aluminum-base brazing alloy to produce a clad product;
 (b) rolling said clad product to form a sheet product;
 (c) annealing said sheet product to a substantially strain-free state; and
 (d) cold working said annealed sheet product to a reduction of from about 10% to about 20%.

12. A brazing material in accordance with claim 11 in which said vanadium constitutes from about 0.02% to about 0.4% by weight of said aluminum-base core alloy.

13. A brazing material in accordance with claim 11 in which said vanadium constitutes from about 0.02% to about 0.4% by weight of said aluminum-base core alloy, and said aluminum-base brazing alloy constitutes from about 5% to about 15% by weight silicon.

14. A method of producing a brazing material, comprising:
 (a) cladding an aluminum-base core alloy containing vanadium as an alloying element with an aluminum-base brazing alloy to produce a clad product;
 (b) rolling said clad product to form a sheet product;
 (c) annealing said sheet product to a substantially strain-free state; and
 (d) cold working said annealed sheet product to a reduction of from about 10% to about 20%.

15. A method in accordance with claim 14 in which said vanadium constitutes from about 0.02% to about 0.4% by weight of said aluminum-base core alloy.

16. A method in accordance with claim 14 in which said vanadium constitutes from about 0.05% to about 0.3% by weight of said aluminum-base core alloy.

17. A method in accordance with claim 14 in which said aluminum-base brazing alloy contains silicon as an alloying element.

18. A method in accordance with claim 14 in which said aluminum-base brazing alloy contains from about 5% to about 15% silicon by weight.

19. A method in accordance with claim 14 in which said aluminum-base core alloy further contains magnesium, manganese or both, as primary alloying elements, and said aluminum-base brazing alloy contains silicon as a primary alloying element.

20. A method of producing a brazing material, comprising:
 (a) cladding an aluminum-base core alloy containing from about 0.02% to about 0.4% vanadium by weight with an aluminum-base brazing alloy containing from about 5% to about 15% silicon by weight to form a clad product;
 (b) rolling said clad product to form a sheet product;
 (c) annealing said sheet product to a substantially strain-free state; and
 (d) cold working said annealed sheet product to a reduction of from about 10% to about 20%.

* * * * *